United States Patent [19]

Bumanlag

[11] Patent Number: 5,753,742
[45] Date of Patent: May 19, 1998

[54] HIGH-SOLIDS, AQUEOUS, POLYMERIC DISPERSIONS

[75] Inventor: Reynaldo G. Bumanlag, Mississauga, Canada

[73] Assignee: The B.F.Goodrich Company, Akron, Ohio

[21] Appl. No.: 690,715

[22] Filed: Jul. 31, 1996

[51] Int. Cl.$^6$ .................................................. C08K 3/20
[52] U.S. Cl. ......................................... 524/501; 524/556
[58] Field of Search ................................. 524/501, 556

[56] References Cited

U.S. PATENT DOCUMENTS

| | | | |
|---|---|---|---|
| 2,111,266 | 12/1938 | Gibello | 260/32 |
| 3,513,121 | 5/1970 | Heaton | 260/29.7 |
| 3,551,374 | 12/1970 | Reinhard et al. | 260/29.6 |
| 3,616,166 | 10/1971 | Kelley | 161/148 |
| 3,707,585 | 12/1972 | Okamoto et al. | 260/883 |
| 4,011,388 | 3/1977 | Murphy et al. | 526/320 |
| 4,125,700 | 11/1978 | Graham | 204/159.16 |
| 4,130,523 | 12/1978 | Hoy et al. | 260/29.6 R |
| 4,135,043 | 1/1979 | Kast et al. | 526/63 |
| 4,269,959 | 5/1981 | Lawton | 526/194 |
| 4,395,500 | 7/1983 | Lohr et al. | 523/221 |
| 4,495,318 | 1/1985 | Howard | 524/375 |
| 4,656,218 | 4/1987 | Kinoshita | 524/460 |
| 4,668,730 | 5/1987 | Iovine et al. | 524/460 |
| 4,680,200 | 7/1987 | Solc | 427/213.34 |
| 4,707,515 | 11/1987 | Gilch et al. | 524/526 |
| 4,721,748 | 1/1988 | Iovine et al. | 524/460 |
| 4,794,065 | 12/1988 | Hedvall et al. | 430/111 |
| 4,810,763 | 3/1989 | Mallya et al. | 526/203 |
| 4,870,143 | 9/1989 | Hashiguchi et al. | 526/70 |
| 5,037,880 | 8/1991 | Schmidt et al. | 524/823 |
| 5,133,992 | 7/1992 | Nair et al. | 427/213.34 |

FOREIGN PATENT DOCUMENTS

| | | |
|---|---|---|
| 0 259 734 A2 | 3/1988 | European Pat. Off. . |
| 0 439 941 A1 | 8/1991 | European Pat. Off. . |
| 0 515 719 A1 | 12/1992 | European Pat. Off. . |

OTHER PUBLICATIONS

An article entitled The Effect of Secondary Minima on the Coagulation of Polydisperse Suspensions, published by CRC Press Inc., Boca Raton, FL, USA, found in *Recent Developments in Separations Sciences*, vol. 4, pp. 71–82 (Jan. 1, 1978).

An article entitled A Generalized Model to Predict the Viscosity of Solutions with Suspended Particles III. Effects of Particle Interaction and Particle Size Distribution, published by John Wiley & Sons, Inc., New York: New York, found in *Journal of Polymer Science*, vol. 50, pp. 123–147 (Jan. 1, 1993).

An article entitled "Packing of Spheres and its Effect on the Viscosity of Suspensions", by Do Ik Lee; Published by Federation of Societies for Paint Technologies; Philadelphia, PA, found in *Journal of Paint Technology*, vol. 42, No. 550, pp. 579–587 (Nov. 1, 1970).

An article entitled "Ultra High Solids Copolymer Emulsion for Demanding Applications", by Mary L. Housman et al., Published by Intertec Publishing, Atlanta, GA, found in *Adhesive Age*, pp. 49–50, 54, 56–57, 59–60 (Oct. 1, 1995).

*Primary Examiner*—Edward J. Cain
*Attorney, Agent, or Firm*—George W. Moxon, II; Samuel B. Laferty; Daniel J. Hudak

[57] ABSTRACT

A very high-solids polymeric dispersion, having a very low percentage of volatile organic compound is prepared by dispersing a plasticized liquid acrylic polymer in water and blending with another high molecular weight polymer dispersion and/or latex in water. This plasticized acrylic polymer dispersion has been found to be useful in combination with high molecular weight polymer dispersion and/or latex containing some smaller diameter particles in the preparation of sealant, caulk, adhesive and coating compositions. Such compositions have a polydisperse particle size distribution due to the larger plasticized liquid acrylic particles and the smaller high molecular weight polymer particles which facilitates higher particle packing densities and hence higher solids content without any undue adverse effect on the dispersion stability and rheological properties. The resulting compositions are more environmentally friendly than solvent based systems, dry quickly, and exhibit good physical properties for sealant use.

20 Claims, No Drawings

HIGH-SOLIDS, AQUEOUS, POLYMERIC DISPERSIONS

FIELD OF THE INVENTION

This invention relates to high-solids aqueous dispersion of a liquid acrylic polymer and a plasticizer blended with a high molecular weight polymer dispersion, and to high-solids coating, sealant and adhesive compositions prepared therefrom, as well as methods for preparing such high solids aqueous dispersion, coating, sealant and adhesive compositions.

BACKGROUND OF THE INVENTION

The utility of aqueous polymeric dispersions in the preparation of paints, coatings, adhesives and caulks or sealants is well known. Water based or water borne polymer dispersions are often preferred because of their relatively low cost, ease of application and because of the relatively low amounts of volatile organic compounds contained therein.

Considerable effort has been expended to provide aqueous dispersions of polymeric materials which are characterized by a high solids content. U.S. Pat. No. 4,130,523 to Hoy et al., for example, discloses an emulsion polymerization process whereby, after an initiation step, wherein a stable seed latex is formed in a reaction zone, a portion of the latex is continuously withdrawn and retained while monomer is continuously added to the reaction zone during an intermediate step. During a final step the withdrawn latex is fed back into the reaction zone along with additional monomer to form a polydisperse particle size distribution which permits greater volumetric packing efficiency and hence a total solids content approaching 70 volume percent. This represents only a relatively modest improvement over more conventional processes which typically achieve a solids content of from about 40 to 65 percent.

Accordingly, still higher solid content aqueous polymer dispersions are desired.

SUMMARY OF THE INVENTION

It has been discovered that by dispersing a liquid acrylic polymer with a plasticizer, having a very low volatility, into water and subsequently blending that dispersion with another high solids, high molecular weight polymeric dispersion in water (preferably a latex), it is possible to obtain a high-solids (low in volatiles), aqueous, polymer dispersion which is highly useful in the preparation of various coating, sealant, caulking and adhesive compositions.

In accordance with a preferred aspect of the invention the high-solids, aqueous, liquid acrylic polymer dispersion comprising a plasticizer and a liquid acrylic polymer is blended with a high molecular weight polymer in the form of a latex or dispersion to provide a high-solids sealant composition. The sealant exhibits desirable rheological and thixotropic properties for sealants and caulks, excellent adhesion with various substrates, high elongation, low modulus, good shelf stability, freeze-thaw stability, and good low temperature flexibility. The blend has a polydisperse or polymodal particle size distribution which is at least partially responsible for the outstanding properties thereof.

DESCRIPTION OF THE PREFERRED EMBODIMENTS

The first acrylic polymer which will be referred to as a liquid acrylic polymer. It is suitably used in the preparation of the high-solids, aqueous, polymer dispersion. It can generally be any of various polymers prepared by free radically initiated addition polymerization of ethylenically unsaturated monomers such as those generally known to be useful in the preparation of adhesives, sealants, caulks and coatings. It can be dispersed in an aqueous medium. While it is conceivable that the liquid acrylic polymer can be prepared by bulk, precipitation or suspension polymerization techniques, it is preferably prepared by solution polymerization methods which are well known to the art and extensively described in the literature. The liquid acrylic polymer may be a blend of two or more acrylic polymers.

The monomers which are useful in the preparation of the liquid acrylic polymer generally include those vinyl, allyl, vinylidene and vinylene group containing monomers which are customarily used in the preparation of water-based or water-borne adhesive, sealant and coating compositions. Such monomers generally include any of various alkyl (alkyl) acrylates such as esters of acrylic and (alkyl) acrylic acids with alcohols (e.g. monohydric) wherein the esters have from 4 to about 16, and more desirably from 4 to about 12 carbon atoms, for example methyl acrylate, methyl methacrylate, ethyl acrylate, ethyl methacrylate, n-butyl acrylate, ethylhexyl acrylate and the like; vinyl esters from a vinyl alcohol with a saturated carboxylic acid, said esters having from 2 to about 18 carbon atoms, such as vinyl acetate, vinyl butyrate, vinyl laurate, vinyl stearate, and the like; or combinations thereof. The use of "(alkyl)" in this specification indicates that an alkyl group such as methyl, ethyl or other alkyls is optionally present in the molecule. In alkyl (alkyl) acrylates the "(alkyl)" represents optional groups such as meth, etc., etc. The foregoing monomers (alkyl acrylates, alkyl (alkyl) acrylates, and vinyl esters) desirably comprise about at least 75 percent, more preferably about at least 80 or 90 percent by weight of the monomers used in the preparation of the liquid acrylic (water-dispersible) polymer. Preferably the alkyl acrylates and alkyl (alkyl) acrylates comprise said percentages. Other monomers which can be used, generally in minor amounts, such as less than 5, 10, 20 or 25 percent by weight based on the total weight of all monomers, include $\alpha,\beta$-ethylenically unsaturated nitriles such as acrylonitrile and methacrylonitrile; $\alpha$-olefins having from about 4 to about 8 carbon atoms such as n-butene, isobutene, n-pentene, and the like; conjugated diolefins having from about 4 to about 8 carbon atoms such as butadiene, isoprene and the like; vinyl aryl compounds having from 8 to about 12 carbon atoms such as styrene, $\alpha$-methyl styrene, vinyl toluene and the like, vinyl and vinylidene halogenides such as vinyl chloride and vinylidene chloride having from 2 to 10 carbon atoms; monomers containing carboxylic acid, amide or hydroxyl functionality such as acrylic acid, methacrylic acid, itaconic acid, acrylamide, methacrylamide, N-methylolacrylamide, hydroxyethyl methacrylate, 2-hydroxyethylacrylate, epoxy acrylates such as glycidyl acrylate or glycidyl methacrylate and the like having from 3 to 12 carbon atoms; as well as various other monomers which are known to be useful in the preparation of water-borne polymeric sealants, adhesives and coatings. The acrylic polymers used in the preparation of the high-solids, aqueous, polymeric dispersion can also contain low amounts, such as less than about 5 and preferably less than about 2 or 3 percent by weight, based on the total weight of all monomers, of monomers which are capable of being easily crosslinked. Examples of such monomers capable of being crosslinked include divinyl compounds such as divinylbenzene, diallyl compounds such as diallyl adipate; diacryl compounds such as tetraethylene glycol diacrylate; and halogen compounds such as vinyl chloroacetate.

The foregoing monomers are selected to obtain a polymer or copolymer which provides the particular properties and characteristics desired in the caulk, sealant, adhesive or coating composition in which it is used. The appropriate selection of monomer or monomers is generally well known to the art and abundantly described in the literature. For example, it is generally well known that high amounts of alkyl acrylate monomers provide softer and more flexible polymers, whereas monomers such as methyl methacrylate, styrene and acrylonitrile tend to provide harder, more rigid polymers. Similarly, it is known that the use of certain functional monomers such as hydroxyalkyl acrylates and acrylamides can improve water dispersability and enhance adhesion with substrates, and that crosslinkable monomers can be used to improve elastomeric properties. The precise selection of monomers does not constitute the present invention. However, the compositions of the present invention have been found to be particular useful in the preparation of sealants and caulks when the monomers are selected to provide a dominant glass transition temperature, e.g. the glass transition of at least 50 wt. % of the liquid acrylate polymer below about 10° C., more desirably below about 0° C., and preferably below about −10° C.

The liquid acrylic polymer is preferably prepared using conventional solution polymerization wherein monomers are fed or charged into a heated reactor volume containing a suitable solvent and free-radial generator. Suitable solvents are well known to the art and the selection thereof does not constitute part of this invention. It is also generally preferred that the solvent be selected to facilitate separation thereof from the polymerization product. Examples of solvents which are generally suitable include benzene, cyclohexane, heptane, toluene, ethylbenzene, acetone, acetic acid and mixtures thereof.

The type of free radical generator employed in the polymerization of the liquid acrylic polymer does not constitute an important aspect of the invention, and generally any of the free radical generating species known to be useful in the solution polymerization of ethylenically unsaturated monomers by chain polymerization can be used. Illustrative of suitable free radical generating species which can be employed are oil soluble initiators such as azo and peroxy initiators including, but not limited to, 2,2'-azobis(2-methylbutyronitrile, di (2-ethylhexyl) peroxydicarbonate, tert-amyl peroxyneodecanote, hexylene glycol peroxy neoheptanote, ditertiary butyl cyclohexanone (ketone peroxide), and the like. Oil soluble redox initiators such as benzoyl peroxide with N,N-dimethyltoluidine can also be used. The initiators are employed in conventional effective amounts which are known by those skilled in the art of solution polymerization. Preferred initiators are lauroyl peroxide and t-butyl peroxy benzoate.

The monomers and initiators can be added to the selected solvent in any conventional manner as desired, i.e., batch, continuously, incrementally, etc. The temperature in the polymerization reaction can vary depending, inter alia, on the type of initiator and monomers used, as is well known to those skilled in the art. Typically when polymerizing lower alkyl acrylates and/or methacrylates and other copolymerizable monomers, it is desirable to initiate polymerization at a temperature of from about 30° C. to about 100° C., and more preferably from about 40° C. to about 85° C. depending on the initiator employed.

Chain-transfer agents can be employed in conventional amounts, as desired, such as in an amount of from about 0.2 to 5 percent by weight of the total weight of all monomers, to control branching and the molecular weight of the polymer. Examples of chain transfer agents which can be employed include long-chain alkyl mercaptans such as t-dodecyl mercaptan, mercaptopropyl trimethoxysilane, and alcohols such as lauryl alcohol and t-octyl alcohol.

The foregoing parameters (monomers, initiators, feed protocol, chain transfer agents, solvent, initiation temperature, etc.) are selected in a manner well known in the art to obtain a liquid acrylic polymer having a number average molecular weight of from about 12,000 to about 30,000, and more preferably from about 15,000 to about 20,000. These molecular weights are lower than those in the high molecular weight polymer in the form of a dispersion (preferably a latex).

Polymerization is preferably allowed to proceed to a high level of conversion of monomer to polymer such as to about 90, 95, 98 percent or higher.

The resulting liquid acrylic polymer is preferably substantially or completely separated from the solvent such as by evaporation, distillation, steam stripping, thin film evaporator, nitrogen or other inert gas stripping, or by other methods generally well known in the art to obtain a viscous liquid acrylic polymer which is substantially free of moisture (water) and volatile organic compounds (VOC solvents). These types of liquid acrylic polymers are commercially available.

In accordance with the principles of this invention, the foregoing liquid acrylic polymer is blended or mixed, preferably under high shear conditions and desirably at elevated temperatures (e.g. 100°–140° F. (38°–60° C.)), with a plasticizer having a relatively low volatility to produce a homogeneous blend.

Suitable plasticizers which can be used in preparing the high-solids, aqueous-based, acrylic polymer dispersion of the invention are generally conventional organic esters or alkyl phenyl ethers of glycols which are soluble or miscible with the acrylic polymer, impart flexibility to the polymer, and which have a boiling point at 1 atmosphere pressure over about 100° C. Suitable plasticizers for use with the invention desirably have a number average molecular weight of from about 200 to about 800, and more preferably from about 300 to about 800. Examples include various phthalate esters from 1,2-benzenedicarboxylates (e.g. di(2-ethylhexyl) phthalate), diisodecyl phthalate, terephthalates such as 1,4-benzenedicarboxylates, trimelliates such as 1,2,4-benzenetricarboxylates and other mono, di or polycarboxylic acids having from 4 to 16 carbon atoms and the like. Other organic ester plasticizers such as adipates, sebacates, azelates, maleates and the like can be used either alone or in combination, although higher molecular phthalates are preferred because of their low volatility. The monohydric alcohol or polyol may have from 2 or 3 to about 10 or 12 carbon atoms. Plasticizers include adipate ester of butyl benzyl alcohol, benzoate ester of dipropylene glycol and alkyl phenyl ether of propylene glycol.

The plasticizer and the liquid acrylic polymer can be blended or mixed in any conventional high shear mixing apparatus capable of achieving a homogenous mixture of the liquid acrylic polymer and plasticizer. These include such mixers as Ross planetary mixer, Myers twin shaft mixer, Cowles high speed dispersers, and Zigma blade mixers. The amount of plasticizer used is desirably from about 20 to about 50 weight percent and more preferably from 25 to about 45 weight percent of the blend of liquid acrylic polymer and plasticizer. The liquid acrylic polymer is desirably from about 50 to about 80 and more desirably from about 55 to about 75 weight percent of the blend.

After the liquid acrylic polymer and the plasticizer have been homogeneously blended, water, emulsifying agents, and optionally pigment dispersants are added and blended into the plasticizer-polymer blend to obtain an aqueous dispersion of the blend of liquid acrylic polymer and plasticizer having a high-solids content and a low volatile organic content (VOC). For the purposes of this application volatile organic materials are defined as compounds having a boiling point at one atmosphere of about 100° C. or 105° C., or less.

The emulsifiers which are added to the plasticizer-acrylic polymer blend are generally any of those commonly employed in emulsion polymerization processes. Examples of suitable emulsifiers include anionic surfactants such as potassium caprylate, potassium myristate, potassium palmitate, potassium stearate, potassium oleate, sodium decyl sulfonate, sodium dodecyl sulfonate, sodium tetradecyl sulfate, sodium decyl sulfate, sodium lauryl sulfate, sodium rosinate, alkyl sodium sulfosuccinate esters, and the like; cationic surfactants such as long chain quaternary amine salts; and nonionic surfactants such as ethylene oxide condensates of oleyl alcohol, cetyl alcohol, lauryl alcohol, etc., ethylene oxide condensates of linoleic acid, lauric acid, caproic acid, etc., block copolymers of ethylene oxide and propylene oxide, ethylene oxide condensates of octyl phenol or nonyl phenol (e.g. Triton™ X-405 from Union Carbide or OPE-40 from HRCROSS Chemicals, Inc.); as Tamol™ 850 from Rohm & Haas Corp., a 30 wt. % solution of polyacrylic acid, sodium salt, and the like, as well as combinations thereof. The particular selection of emulsifiers and the amounts thereof are readily determinable by those skilled in the art. The emulsifiers are utilized in amounts which are effective for achieving a stable dispersion of the polymer and plasticizer in an aqueous medium. Typically, emulsifiers are employed in amounts of from about 0.1 to about 10 parts by weight per 100 parts by weight of the liquid acrylic polymer.

The amount of water added to the homogeneous blend of plasticizer and liquid acrylic polymer is generally relatively low, such as from about 8 or 9 to about 15 or 20 parts by weight per 100 parts by weight of the plasticized liquid acrylic polymer.

The resulting aqueous dispersion of plasticizer and liquid acrylic polymer is generally characterized by a thick creamy consistency, and desirably has a solids content of from about 75 or 80 to about 92 or 93 more desirably from about 85 to about 91 or 92 percent by weight, with the plasticizer and liquid acrylic polymer blend being dispersed therein in the form of particles generally having a number average particle diameter of from about 0.5 to about 12 microns (micrometers), and more preferably having a number average particle diameter of from about 1 to about 8 microns.

Total solids content as used herein refers to the portion of the aqueous dispersion, sealant, caulk, adhesive or coating composition which when heated to a temperature of 105° C. for one hour at one atmosphere pressure remains unvolatilized. Accordingly, the solids content, as used herein, generally refers to polymeric materials, nonvolatile plasticizers, inorganic solids and non-volatile organic materials, whereas the non-solid portion is generally comprised of water and any organic materials readily volatilized at 105° C.

Diameter as used herein refers to the largest diameter, i.e., largest linear dimension of each particle. The above parameters relating to particle size were determined using a multisizer using an orifice size of 140 microns. These determinations correlate well with various other particle sizing techniques such as light scattering measurements, sedimentation, column chromatograph, and examination using electron microscopy.

The above described aqueous dispersions, which are prepared from a blend of a liquid acrylic polymer, plasticizer, water and emulsifier have been found to be particularly useful in the formulation of high-solids, low volatile organic content (VOC) adhesives, coatings, sealants and caulks which exhibit excellent rheological, thixotropic, adhesive, low-shrinkage, and quick drying properties. Such adhesive, coating, sealant and caulk formulations are prepared by blending the above described aqueous plasticizer liquid acrylic dispersion with an aqueous based high molecular weight polymer latex and/or dispersion and desirably with inorganic fillers and/or pigments under high shear, high speed mixing conditions.

The high molecular weight polymer latex or dispersion is generally any addition polymerization polymer dispersion obtained using conventional emulsion polymerization methods, dispersion polymerization techniques, or combinations thereof. The polymers of the high molecular weight polymer latex or dispersion differ from the liquid acrylic polymer of the dispersion of a blend of a liquid acrylic polymer and a plasticizer in that they have a number average molecular weight greater than 30,000 more desirably above 50,000 and preferably above 60,000. The monomers which can be used in the preparation of the high molecular weight acrylic latex are generally the same as those listed above for the water-dispersible liquid acrylic polymer prepared by the solution polymerization technique. In particular, the high molecular weight polymer is prepared from various vinyl, allyl, vinylidene and vinylene group containing monomers such as alkyl (alkyl) acrylates, vinyl esters, nitriles, α-olefins, conjugated diolefins, vinyl aryl compounds, vinyl and vinylidene halogenides, unsaturated carboxylic acids and functional group containing derivatives thereof, crosslinking monomers (e.g. divinyl, diacryl and diallyl compounds), as well as various other monomers which are known to be useful in the preparation of polymer latices used in caulk, sealant, adhesive and coating formulations. The polymeric portion of the latex is generally comprised of at least about 75 percent, and more preferably at least about 80 or 90 percent by weight of one or more alkyl acrylate or alkyl (alkyl) acrylate monomers having from 4 to about 16 carbon atoms and more desirably from 4 to 12 carbon atoms, vinyl esters of a saturated carboxylic acid with a vinyl alcohol, said ester having from 2 to about 18 carbon atoms, or combinations thereof.

Free radical polymerization of the high molecular weight polymer latex or dispersion is typically achieved using any of the well known water-soluble initiators generally employed in emulsion polymerization. Examples of suitable free radical initiators include hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5 bis(hydroperoxy) hexane, perbenzoic acid, t-butyl peroxypivalate, t-butyl peracetate, azo-bis-isobutylonitrile, ammonium persulfate, sodium persulfate, potassium persulfate, sodium perphosphate, potassium perphosphate, isopropyl peroxycarbonate, etc.; and redox systems such as sodium persulfate with sodium formaldehyde sulfoxylate, cumene hydroperoxide with sodium metabisulfite, hydrogen peroxide with ascorbic acid, etc. The initiators are used in the usual amounts known to be effective by those skilled in the art of emulsion polymerization.

Any of the emulsifiers commonly employed in emulsion or dispersion polymerization processes can be used in the preparation of the high molecular weight polymer latex or dispersion, including those emulsifiers previously listed as being suitable for use in the preparation of the above described aqueous dispersion of the liquid acrylic polymer and plasticizer. The surfactant is generally employed in conventional amounts, such as in amounts of from about 0.1 to about 10 parts by weight per 100 parts by weight of total monomer, to achieve a stable polymer dispersion.

Conventional chain transfer agents can be used as desired to control branching and to reduce the molecular weight.

The monomers, initiators, emulsifiers, and other conventional ingredients such as buffers and alkali metal hydroxides, amines or other pH adjusting agents, etc. can individually or in combinations be added to the polymerization reaction volume either in a batch, continuously, or incrementally in any convenient manner known to the art of polymerization depending on the desired characteristics of the high molecular weight polymer latex or dispersion. It is well within the ability of those skilled in the art of polymerization to control the flow of buffer, initiator, monomer and emulsifier into the reaction volume so as to maintain the desired polymerization conditions.

The initiation temperature for the polymerization of the high molecular weight polymer latex or dispersion depends, inter alia, on the type of monomers used and on the type of initiator used. Suitable polymerization temperatures are well known to those skilled in the art of emulsion polymerization, and desirably range from about 10° C. to about 100° C., and more preferably from about 40° C. to about 85° C. The polymerization is generally carried out to high conversions of monomers to polymers such as 80, 90, 95, 98 percent or higher.

The above parameters, such as the choice and amount of initiator and surfactant used, are selected in a manner well within the ability of those skilled in the art of polymerization to obtain a desirable high molecular weight polymer latex, or dispersion. As many high solids (50% solids or more) acrylate latices are commercially available they are a convenient source of a latex for this application.

As shown in Table IV, it is sometimes desirable to use an aqueous based high molecular weight polymer dispersion (e.g. Ultraseal™) instead of an aqueous based latex. The Ultraseal™ polymer is a high solids acrylic polymer having a very broad particle size distribution (e.g., having particles from about 0.1 µm up to 200 µm in diameter). The Ultraseal polymer is a preferred source of the aqueous based high molecular weight polymer dispersion. An example polymerization of an Ultraseal™ dispersion is included within the examples. Ultraseal™ polymer dispersions are desirable because the solids contents are higher than those of conventional latices.

The Ultraseal™ dispersions are usually made from one of three commercially available high solids latices. They are Rhoplex™ 2620 from Rohm & Haas available through their distributor Chemcentral Corp. in cities such as Cleveland, Ohio (62 weight percent solids acrylate latex); Carbobond™ XPD 2254 from The BFGoodrich Company, Brecksville, Ohio (67 weight percent solids acrylate latex); and Acronal™ V275 from BASF, Charlotte, N.C. (65 weight percent solids acrylate latex). These starting latices are all believed to be multimodal latices principally of acrylate monomers with small amounts of unsaturated monocarboxylic acid monomers. The Acronal™ V275 varies from the others in having a few weight percent acrylonitrile in the polymer.

Different Ultraseal™ compositions are presently available for experimentation. Common characteristics are that the pH of the latex is adjusted between 3 and 9, more desirably between 5 and 7, and then additional monomers are added and polymerized using the starting latex as a medium. A stirrer capable of stirring and homogenizing materials with paste-like viscosities is generally required. Thixotropic aqueous based dispersions are produced having solid contents from 75 wt. % to about 90 or more wt. %. Initially, small polymer particles are formed (e.g., as small as less than 0.5 µm or less than 0.1 µm) but sometime later in the polymerization (depending on many variables) some controlled aggregation or agglomeration occurs and the relative amount of small particles decrease and new particles of diameters of 2 or 4 µm and larger are formed. The new particles with diameters above 2 or 4 µm are desirably nonspherical having an average aspect ratio between the largest and smallest diameter of individual particles of at least 1.5. These polymer dispersions are desirable as they are high solids (e.g. up to about 92 weight percent) and carry small amounts of water and organic volatiles into subsequent formulations.

EXAMPLE OF ULTRASEAL TYPE LATEX

A 50:50 solution of the deionized water and concentrated ammonium hydroxide (29–30 weight percent $NH_3$) was prepared and added dropwise to a carboxylated latex (Rhoplex™ 2620, Carbobond™ XPD2254, or Acronal™ V275) with vigorous stirring to adjust the pH of the latex to about 6.0. The partially neutralized latex was then added to a reactor and stirred under nitrogen at 100 rpm. In a typical lab preparation a 4 liter jacketed resin kettle was used as the reactor. A low speed, high torque electrically powered stirrer equipped with an anchor type blade was used for agitation. The temperature was controlled using an external heating/cooling bath which circulates a water/glycol mixture through the resin kettle jacket. The latex was heated to 75° C. and a solution of the lauryl mercaptan, t-amyl peroxyneodecanoate, ethyl acrylate, and butyl acrylate was added over a 1.5 hour period. The batch temperature was maintained in the 75°–85° C. range throughout the addition. Fifteen minutes after addition was complete, the t-butyl hydroperoxide (1.43 g) was added and cooling was begun. The t-butyl hydroperoxide was the first half of the red-ox scavenging system used to reduce the level of unreacted free monomer to an acceptable level. When the batch temperature reached 50° C., a solution of 33.3 weight percent of the sodium formaldehyde sulfoxylate, deionized water and 33.3 weight percent anionic surfactant was added. The sodium formaldehyde sulfoxylate catalyzes the t-butyl hydroperoxide causing it to form free radical containing species which react with any residual free monomer. The batch was stirred for 1 hour more at 50° C. during which time the residual monomer was scavenged (consumed), then cooled to room temperature and removed from the reactor. The resultant polymer was very thixotropic. The particle size distribution was multimodal.

| ULTRASEAL ™ DISPERSION A 79.72 Percent Solids Polymer | | |
|---|---|---|
| REAGENT | WEIGHT (g) | WEIGHT (%) |
| Latex (67.3% solids) | 4545 | 60.12 |
| Ammonium hydroxide (29–30 wt. %) | 21.5 | 0.28 |
| Deionized water | 21.5 | 0.28 |
| Lauryl mercaptan | 2.92 | 0.04 |
| t-Amyl peroxyneo-decanoate | 11.59 | 0.15 |

-continued

ULTRASEAL ™ DISPERSION A
79.72 Percent Solids Polymer

| REAGENT | WEIGHT (g) | WEIGHT (%) |
| --- | --- | --- |
| Ethyl acrylate | 1450 | 19.18 |
| Butyl acrylate | 1450 | 19.18 |
| t-Butyl hydroperoxide | 5.32 | 0.07 |
| Sodium formaldehyde sulfoxylate | 10.64 | 0.14 |
| Deionized water | 31.90 | 0.42 |
| Anionic surfactant* | 10.63 | 0.14 |

*ABEX JKB ™ a 30 wt. % solution of an anionic surfactant in water available from Rhone-Poulenc, Cranbury, New Jersey.

The final dispersion had a cone and plate viscosity (Brookfield Model DVII) of 6,000 cps at 100 rpm (75° F.) and 300,000 at 1 rpm (75° F.). Fully coalesced and dried films of this dispersion showed two separate glass transition temperatures. The particle size distribution of this dispersion was typically bimodal with one mode centered at 0.4 to 0.7 microns and the second mode centered at 2 to 4 microns.

The starting latex media for this example is a carboxylated acrylic latex having a solids content of about 66 weight percent and a pH of about 2 and a viscosity of about 200 cp. It is commercially available from The BFGoodrich Company under the tradename Carbobond™ XPD 2254.

Another Ultraseal™ dispersion B was made to about 87% solids using the recipe below.

ULTRASEAL ™ DISPERSION B
87.17 Percent Solids Polymer

| REAGENT | WEIGHT (g) | WEIGHT (%) |
| --- | --- | --- |
| Latex (67.3% solids) | 4545 | 36.26 |
| Ammonium hydroxide (29–30 wt. %) | 21.5 | 0.17 |
| Deionized water | 21.5 | 0.17 |
| Lauryl mercaptan | 7.9 | 0.06 |
| t-Amyl peroxyneo-decanoate | 31.2 | 0.25 |
| Ethyl acrylate | 3877 | 30.92 |
| Butyl acrylate | 3877 | 30.92 |
| t-Butyl hydroperoxide | 14.3 | 0.11 |
| Sodium formaldehyde sulfoxylate | 28.6 | 0.23 |
| Deionized water | 85.8 | 0.68 |
| Anionic surfactant* | 28.6 | 0.23 |

*ABEX JKB ™

The final dispersion has a cone and plate viscosity (Brookfield Model DVII) of <10,000 cps at 100 rpm (75° F.) and >100,000 at 1 rpm (75° F.). The polymer exhibits good long term storage stability. The polymer was easily spread into thin films. The particle size distribution of this dispersion was typically trimodal with one mode centered at 0.4 to 0.7 microns, one mode centered at 2 to 4 microns and a third mode centered at 8 to 30 microns. Fully coalesced and dried films of this dispersion show two separate glass transition temperatures as in Dispersion A.

Another Ultraseal dispersion at about 87% solids was made using the same procedure and recipe but substituting as the starting latex Rhoplex™ 2620 (commercially available latex) from Rohm and Haas at 62 weight percent solids and having a monomer composition similar to Carbobond™. The resulting polymer dispersion had 85.8 weight percent solids and a viscosity at a pH of 6 similar to Dispersion B.

Another Ultraseal™ dispersion at about 87% solids was made using the same procedure and recipe but substituting as the starting latex Acronal V275™ from BASF at 65 weight percent solids and having a monomer composition similar to Carbobond™ plus a few weight percent acrylonitrile. The resulting polymer dispersion had 86.5 weight percent solids and a viscosity at a Ph of 6 similar to Dispersion B.

The various high-solids, low VOC sealant, caulk, adhesive and coating formulations of the invention are prepared by blending the above referenced high molecular weight polymer latex or dispersion with the previously described high-solids aqueous dispersion containing a blend of the liquid acrylic polymer and plasticizer. The high molecular weight polymer latex is preferably added to the plasticizer-polymer dispersion of liquid acrylic polymer and then the fillers and other additives are added. They are blended using high-shear, high speed mixing apparatus to obtain a creamy, smooth mixture having a total solids content of from about 75 or 80 to about 95, and more preferably from about 83 or 87 to about 92, 93 or 95, percent by weight as determined by drying at 105° C. for 1 hour. Desirably the volatiles under these conditions are from about 5 to about 20 wt. %, more desirably from about 5 or 7 to about 12 wt. %. Desirably less than 10 wt. % volatiles are volatilized under these conditions.

After the above ingredients have been combined and mixed uniformly into the sealant composition, the composition is then preferably subjected to a vacuum to suitably de-aerate the composition, generally under low speed mixing conditions.

The amount of high molecular weight polymer latex or dispersion used is typically from about 100 to about 200 parts by weight, and more preferably from about 140 to about 180 parts by weight, per 100 parts by weight of the plasticizer-liquid acrylic polymer dispersion. This results in the plasticized acrylic dispersion being from about 10 to about 50 or 60 wt. %, more desirably from about 15 to about 40 wt. % of the sealant composition. The high molecular weight polymer latex or dispersion is desirably from about 10 to about 80, more desirably from about 15 to about 50 wt. % of said sealant composition.

The combination of relatively smaller polymer particle diameters (desirably having a number average particle diameter of less than about 1 μm or 2 μm) from the high molecular weight polymer latex, and relatively larger polymer particle diameters (typically a number average particle diameter of from about 0.5 to about 12 μm and preferably from about 1 to about 8 μm) from the plasticizer-liquid acrylic polymer dispersion, in conjunction with the stated amounts thereof, provides for dense packing of the polymer particles with the smaller particles generally filling the interstices between the larger diameter particles, without undue agglomeration or aggregation of the particles, thereby providing a high-solids formulation exhibiting excellent rheological properties. In particular, a highly extrudable or gunnable composition having a high-solids content and which can be easily applied in a conventional manner such as from conventional caulking cartridges using a hand operated caulking gun is provided by the invention. The foregoing advantages are believed to be largely attributed to the polydisperse or polymodal particle size distribution of the composition. Polymodal particle size distribution means that the number or weight average particle size distribution (i.e. number or weight average of particles of a particular diameter or range of diameters plotted against diameter) includes at least two distinct peaks, and thereby encompasses bimodal and other polymodal particle size distributions with more than two distinct peaks.

It has been found that rheology modifying agents, particularly polyacrylates such as those available from Rohm & Haas Co. which are sold under the trade designation "Acrysol" (e.g., Acrysol TT-615) can be added, concurrently or contemporaneously with the high molecular weight polymer latex, to the high-solids plasticizer-polymer dispersion to achieve better gunning and tooling. Such rheology modifying agents can be advantageously employed in amounts such as from about 0.5 to about 4, and more preferably in amounts from about 0.8 to 2 parts by weight of the as received rheology modifying agent per 100 parts of the combined weight of the plasticizer-liquid acrylic polymer dispersion and the high molecular weight polymer latex or dispersion. The thickening agents, when used, are preferably homogeneously blended into the high-solids plasticizer-liquid acrylic polymer dispersion along with the high molecular weight polymer latex using high-shear, high-speed mixing. These polyacrylates may also enhance particle stability, enhance water release for early skinning of the coating or sealant, and provide additional crosslinking sites for Zinplex™ 15.

Fillers and/or pigments are desirably added to the above high-solids formulation. Such fillers and/or pigments (hereinafter collectively termed "fillers") are generally added in amounts which are effective for reducing cost, further increasing solids content, and/or improving slump or anti-sag characteristics, without deleteriously affecting adhesive, cohesive and rheological properties. Examples of fillers which can be advantageously employed include calcium carbonate, barytes, silicates, glass spheres and bubbles, clays, titanium dioxide, carbon black, etc. Preferred fillers include calcium carbonate, titanium dioxide, and precipitated silica, which can be used in combinations. The fillers are desirably used in total amounts of from about 20 to about 200 parts, and more preferably from about 40 or 65 to about 100 or 175 parts by weight per 100 parts by weight of the dispersion liquid acrylic polymer and plasticizer in water. This generally results in the filler(s) being from about 10 to about 80 wt. %, more desirably from about 10 to about 60 wt. % of the sealant composition.

When adding pigments high in $Mg^{++}$ or $Ca^{++}$ ions, it is desirable to add dispersants for the pigments which are non-precipitating with $Mg^{++}$ and $Ca^{++}$. Such dispersants include NaZn phosphate (e.g., Composition T from Calgon Corp.).

The fillers are preferably added incrementally to the blend or dispersion comprising the plasticizer-polymer dispersion and high molecular weight polymer latex (which for convenience will henceforth be referred to as a sealant composition) in order to facilitate uniform distribution of the fillers therein.

Mineral oil is desirably added to the sealant composition in amounts of from about 2 to about 6 parts by weight per 100 parts by weight of the plasticizer-liquid acrylic polymer dispersion and the high molecular weight polymer latex or dispersion. Mineral oil enhances hydrophobicity for early water release, aids in defoaming and deaeration, and improves tooling.

It is also desirable to add ionic crosslinkers such as are commercially available from Ultra Additives Inc. under the trade designation "Zinplex 15", a 30 percent zinc ammonium complex in water. These may be used in amounts of from about 0.25 to about 2 percent of the as received solution based on the total weight of the sealant composition.

In order to impart freeze resistance and/or good freeze-thaw properties, it is generally desirable to add an effective amount of an anti-freeze agent, such as ethylene glycol or propylene glycol, to the sealant composition. Suitable amounts of anti-freeze agents range from about 0.75 to about 2 percent based on the total weight of the sealant composition.

Adhesion promoters, particularly silane compounds, are desirably added to the sealant composition in amounts which are effective to improve adhesion with various substrates such as glass or metal. Examples of suitable silane adhesion promoters include mercaptopropyl trimethoxysilane, glycidoxypropyl trimethoxysilane, aminopropyl triethoxysilane, and the like. Such adhesion promoters can be utilized in amounts of from about 0.1 to about 0.25 percent based on the total weight of the sealant composition.

The anti-freeze agents and adhesion promoters are desirably premixed and added to the sealant composition as a blend.

Preservatives and fungicide/mildewcides may be used in the sealant for in-can preservation and to prevent mildew growth on the applied sealant. They are used at a concentration of from about 0.1 to about 10 weight percent based on the total weight of the sealant.

Essence may be used at concentrations from about 0.01 to about 0.1 weight percent based on the weight of the sealant to mask odors and enhance user acceptance.

UV absorbers and UV stabilizers may be added, especially to clear sealant formulations to minimize the unwanted effects of UV induced degradation of the polymer and other components of the formulation. Absorbers and stabilizers are usually used in combination and may result in synergistic advantages.

Colorants are added to provide aesthetics either to match the area surrounding the sealant or to provide a pleasing contrast. Colorants are composed of colored pigments dispersed in a vehicle that is compatible with the sealant formulation.

While the above formulation has been generally described as a sealant composition or caulking, it should be understood that such formulations can be used, or can be readily adapted for use as coatings, and adhesives.

The high-solids, low VOC sealants, caulks, adhesives and coatings of the invention can be applied to various surfaces generally using any of the conventional techniques for applying such compositions. For example, the sealant, caulk and adhesive compositions are most preferably loaded into conventional type sealed cartridges which can be used in association with a conventional caulking gun to extrude or gun the compositions. Also, the composition may be packaged in larger bulk containers such as 5 gallon drums or 55 gallon barrels. The viscosity of the sealant composition as measured by ASTM D2452-75 is desirably such that 20 grams of sealant is extruded in a minimum of 10 seconds at 20 psi, and a maximum of 50 seconds at 60 psi exerted on the cup plunger.

The high-solids, low VOC sealant, caulk, adhesive and coating compositions are relatively environmentally friendly and dry quickly, while exhibiting other outstanding properties such as good application characteristics (e.g. extrudability through 0.104 in. diameter orifice), good anti-sag or anti-slump properties (e.g. as demonstrated by the Boeing Jig Sag test method), good freeze-thaw stability, low modulus (e.g. low Shore "A" hardness), good adhesion to various substrates (e.g. aluminum, glass and concrete), good high temperature stability, and good elongation (e.g. as demonstrated by ASTM-D-412 test method).

When used with water based sealants or caulking compounds, generic terms may have more specific meanings as defined below. Compatibility is the ability of the polymer or blends thereof to remain uniformly suspended without forming large agglomerates. Film cast from unfilled compositions on glass should be continuous with reasonable clarity on curing if compatibility is good.

Mechanical stability is the ability of the polymer dispersion to withstand high shear mixing for a certain length of time. The degree of agglomeration and viscosity change after mixing or the maximum mixing time before a specific change in viscosity characterizes the mechanical stability.

High filler loading capability refers to the ability of the polymer dispersion to accept large amounts of filler without excessive viscosity increases and without coagulation. Usually the capability is measured by stepwise addition of filler to a defined viscosity or to coagulation. The measure is empirical and specific to the extender used.

The utility, properties and method of preparing the compositions of the invention can be more fully appreciated by reference to the following illustrative examples.

EXAMPLE 1

The merits of the invention were qualitatively assessed by blending a liquid acrylic polymer, substantially free of water and organic solvents, with a phthalate ester plasticizer and then water and emulsifiers. The aqueous dispersion was then blended with various commercially available polymer latices. These blends were qualitatively evaluated for compatibility of the plasticizer-polymer dispersion with each polymer latex, and for mechanical stability and filler loading capacity of each latex-dispersion blend. The monomers used in the preparation of the liquid acrylic polymer ("Acrylic Polymer A") are listed in Table I where PBW means parts by weight. The composition of the plasticizer-polymer aqueous dispersion ("High Solids Aqueous Dispersion") is listed in Table II.

TABLE I

| LIQUID ACRYLIC POLYMER A | |
|---|---|
| BUTYL ACRYLATE = | 84–86 PBW |
| ETHYL ACRYLATE = | 12–13 PBW |
| ACRYLIC ACID = | 2–3 PWB |

TABLE II

| HIGH SOLIDS AQUEOUS DISPERSION | |
|---|---|
| LIQUID ACRYLIC POLYMER A = | 264 PBW |
| * ESTER PLASTICIZER = | 132 PBW |
| TRITON X-405 (EMULSIFIER) = | 14 PBW |
| TAMOL 850 (EMULSIFIER) = | 1.5 PBW |

TABLE II-continued

| HIGH SOLIDS AQUEOUS DISPERSION | |
|---|---|
| WATER = | 35 PBW |
| COMPOSITION T (DISPERSANT) = | 3 PBW |

* The ester in Table II can be Santicizer ™ 160 from Monsanto Industrial Chemical in St. Louis, Missouri an adipate ester of butyl benzyl alcohol; Benzoflex ™ 9-88 from Velsicol Chemical Corp., Chicago, Illinois, a benzoate ester of dipropylene glycol; or Plastilit ™ 3060 from BASF Corp., in Charlotte, North Carolina an alkyl phenyl ether of propylene glycol.

The qualitative results, shown in Table III, indicate that the plasticizer-polymer dispersions of the invention are generally compatible with a variety of commercially available latices, and that the resulting blends thereof exhibit adequate (fair) to very good mechanical stability. The results also indicate that high amounts of inorganic fillers can be added to the blend of the dispersion of liquid acrylic polymer with plasticizer with latex blends (particularly in those blends wherein the latex is "Rhoplex E-1950" or "Rhoplex 2620") without causing coagulation or excessively high viscosities.

TABLE III

COMPATIBILITY AND RUBOSITY CHECK WITH COMMERCIAL LATEX

| $8/3 = \dfrac{\text{LIQUID ACRYLIC POLYMER A *}}{\text{LATEX SOLIDS}}$ | COMPATIBILITY | MECHANICAL STABILITY | FILLER LOADING CAPABILITY |
|---|---|---|---|
| BASF, ACRONAL V275 | GOOD | FAIR | POOR |
| ROHM & HAAS, RHOPLEX E-1950 | EXCELLENT | VERY GOOD | VERY GOOD |
| ROHM & HAAS, RHOPLEX 2620 | EXCELLENT | VERY GOOD | GOOD |
| BFGOODRICH, CARBOBOND ™ XPD2254 | GOOD | FAIR | POOR |

* This is the material from Table II.

EXAMPLE 2

Sealant compositions HS #2, HS #3 and HS #3A were prepared in accordance with the procedures and with the components listed in Table IV. Table V illustrates the performance of the sealant compositions in a variety of standardized tests.

TABLE IV

| CAULKING COMPOSITION | | HS #2 | HS #3 | HS #3A |
|---|---|---|---|---|
| -PRE-HEAT LIQUID ACRYLIC POLYMER OVERNIGHT IN THE 158 F OVEN | | | | |
| LOAD INTO A CLEAR MIXER SET AT 140 F | | | | |
| MIX UNTIL UNIFORM | | | | |
| (100%) SOLIDS | LIQUID ACRYLIC POLYMER A | 620 g | 620 g | 620 g |
| | SANTICIZER 160 (PLASTICIZER) | 310 | 310 | 310 |
| THEN ADD | | | | |
| | TRITON X-405 (EMULSIFIER) | 34 | 34 | 34 |
| PRE-MIX BEFORE ADDING | | | | |
| | TAP WATER | 100 | 100 | 100 |
| | TAMOL 850 (EMULSIFIER) | 3.4 | 3.4 | 3.4 |
| | COMPOSITION T (DISPERSANT) | 3.4 | 3.4 | 3.4 |
| -MIX AT LOW SPEED FOR 2 MIN. THEN INCREASE SPEED UNTIL EMULSION IS FORMED. THEN ADD: | | | | |
| | ACRYSOL TT615 | 20 | 24 | 24 |
| | ULTRASEAL POLYMER | 1530 | 1900 | 1900 |

TABLE IV-continued

| CAULKING COMPOSITION | HS #2 | HS #3 | HS #3A |
|---|---|---|---|
| -MIX FOR 2 MIN. THEN INCREASE SPEED UNTIL A UNIFORM EMULSION IS FORMED. THEN ADD: | | | |
| CALCIUM CARBONATE | 500 | 600 | 600 |
| SILICA | 20 | 20 | 20 |
| FUNGICIDE/MILDEWCIDE | 1.5 | 2 | 2 |
| -MIX FOR 5 MIN THEN ADD: | | | |
| CALCIUM CARBONATE | 500 | 600 | 600 |
| $TiO_2$ | 60 | 80 | 80 |
| -MIX FOR 5 MIN THEN ADD: | | | |
| CALCIUM CARBONATE | 600 | 600 | 600 |
| -MIX FOR 5 MIN AT MEDIUM SPEED UNTIL UNIFORM THEN ADD: | | | |
| ZINPLEX 15 | 24 | 30 | 30 |
| MIX FOR 5 MIN THEN ADD: | | | |
| MINERAL OIL | 80 | 80 | 80 |
| -PRE-MIX BEFORE ADDING AS A PREMIX: | | | |
| SILANE COUPLING AGENT | 12 | 12 | 12 |
| PROPYLENE GLYCOL | 40 | 40 | 40 |
| TOTALS | 4458.3 | 5058.3 | 5058.3 |

TABLE V

| CAULKING COMOPSITION | HS #2 | HS #3 | HS #3A |
|---|---|---|---|
| EXTRUDABILITY 0.104" ORIFICE 20 g ASTM D2452-75 | | | |
| 40 psi @ 77F (FRESH): sec | 48 | 56 | 23 |
| AGED OVERNIGHT: sec | 55 | 56 | 27 |
| AFTER 14 DAYS @ 120° F.: sec | 100 | N/A | 42 |
| 60 psi @ 77F (FRESH): sec | N/A | 19 | N/A |
| AGED OVERNIGHT: sec | N/A | 19 | N/A |
| AFTER 14 DAYS @ 120° F.: sec | N/A | 66 | N/A |
| BOEING JIG SAG ASTM D2208-88 | 0 | 0 | 0 |
| pH | 8.0 | 8.1 | 8.1 |
| SOLIDS ACTUAL (THEOR) WT. % | 87.31 (89.23) | 87.46 (89.00) | 87.56 |
| FREEZE - THAW STABILITY ASTM C731 | | | |
| 3 CYCLES @ −18C | PASS | PASS | PASS |
| 5 CYCLES @ −18C | PASS | PASS | PASS |
| SHORE "A" HARDNESS | 20 | 18 | N/A |
| TENSILE(ASTM D-412)psi @ PEAK | N/A | 34.9 | N/A |
| ELONG(ASTM D-412)% | N/A | 448.2 | N/A |
| TEAR STRENGTH (pli) (ASTM D-412) | N/A | 12.65 | N/A |
| PEEL ADHESION: AFTER 21 DAYS 25° C. ASTM C794 | | | |
| ALUMINUM N/mm WIDTH | 2.01 CF/AF* | 2.47 CF* | 2.21 AF/CF |
| GLASS N/mm | 1.98 CF/AF | 2.45 CF/AF | 2.50 CF |
| CONCRETE N/mm | 1.94 AF/CF | 3.02 CF | 2.02 CF |
| PEEL ADHESION 21 DAYS + 7 DAYS WATER TO: ASTM C794 | | | |
| ALUMINUM N/mm WIDTH | 2.00CF | 2.35CF | 2.28 CF |
| GLASS N/mm WIDTH | 1.09AF | 1.48AF | 1.47 AF |
| CONCRETE N/mm WIDTH | 1.05CF | 1.81CF | 1.71 CF |
| H BEAD TENSILE AFTER 21 DAYS | | | |
| ALUMINUM STRESS AT MAX LOAD (MPa) | 0.2014 | 0.05723 | 0.05701 |
| % ELONG AT MAX LOAD | 188.7 | 524.8 | 334.1 |
| STR. AT 100% ELONG (MPa) | 0.1408 | 0.03321 | 0.03558 |
| FAILURE MODE | 75/25:CF/AF | 100% CF | 100% CF |
| GLASS STRESS AT MAX LOAD (MPa) | 0.1564 | 0.06115 | 0.05285 |
| % ELONG AT MAX LOAD | 199.4 | 494.4 | 296.8 |
| STR. AT 100% ELONG (MPa) | 0.09272 | 0.03278 | 0.03522 |
| FAILURE MODE | 100% VSCF | 100% CF | 100% CF |
| CONCRETE STRESS AT MAX LOAD (MPa) | 0.275 | 0.0824 | 0.114 |
| % ELONG AT MAX LOAD | 211.3 | 457 | 298.3 |
| STR. AT 100% ELONG (MPa) | 0.1743 | 0.0463 | 0.06607 |
| FAILURE MODE | 60/40:CF/AF | 100% CF | 100% CF |
| 21 DAYS + 7 DAYS WATER IMMERSION | | | |
| ALUMINUM STRESS AT MAX LOAD (MPa) | 0.06096 | 0.04723 | 0.03329 |
| % ELONG AT MAX LOAD | 295.3 | 524.9 | 436.4 |
| STR. AT 100% ELONG (MPa) | 0.038 | 0.03163 | 0.02205 |
| FAILURE MODE | 100% CF | 100% CF | 100% CF |

TABLE V-continued

| CAULKING COMOPSITION | HS #2 | HS #3 | HS #3A |
|---|---|---|---|
| GLASS STRESS AT MAX LOAD (MPa) | 0.05327 | 0.04411 | 0.03267 |
| % ELONG AT MAX LOAD | 291.5 | 523.9 | 355.7 |
| STR. AT 100% ELONG (MPa) | 0.03211 | 0.02955 | 0.0232 |
| FAILURE MODE | 100% CF | 100% CF | 100% CF |
| CONCRETE STRESS AT MAX LOAD (MPa) | 0.05181 | 0.04245 | 0.04369 |
| % ELONG AT MAX LOAD | 227.7 | 319.9 | 467.6 |
| STR. AT 100% ELONG (MPa) | 0.03682 | 0.03267 | 0.02434 |
| FAILURE MODE | 100% AF | 100% CF | 100% CF |

In the above Table V, G means good, VG means very good, CF means cohesive failure, AF means adhesive failure, SCF means shallow cohesive failure, and VSCF means very shallow cohesive failure.

Each of the compositions (HS #2, HS #3, and duplicate of HS #3 labeled HS #3A) were evaluated to determine various properties relating to their utility as sealants. In particular, the results of quantitative evaluation of extrudability (ASTM D2452-75 modified so the time to extrude 20g is reported), anti-sag characteristics (as determined by the Boeing Jig Sag test method (ASTM D2202-88)). Shore "A" hardness, high temperature stability (as determined by extrudability after storage at 120° F. for 14 days), tensile elongation, peel adhesion (ASTM C794 and GCSB CAN2-19.0-M77, Method 14.6) (on aluminum, glass and concrete), and H-bead tensile strength (on aluminum, glass and concrete) are listed in Table V. The results of qualitative evaluations on freeze-thaw stability (ASTM C-731 and CGSB/CAN2-19.0-M77, Method 6.1) and Tab Adhesion (forced cure on aluminum, glass and concrete), along with pH and solids content are also listed in Table V. The Tab Adhesion Test is an empirical test to assess the properties of a sealant on a given substrate. The relative force involved and the nature of failure (whether cohesive or adhesive) is usually noted. The Peel Adhesion Test is ASTM C794.

The results show that the high-solids sealant invention have favorable rheological, physical and adhesion properties, which make them highly useful sealants.

EXAMPLE 3

Another sealant composition in accordance with the invention was prepared as outlined in Table VI. The results of extrudability, Boeing Jig Sag, peel adhesion, elastic recovery, Hockmann (Procedure) Cycle (ASTM C-719-86 (a laboratory accelerated testing procedure for evaluating a building sealant)) and low temperature flexibility tests, along with the percent solids and pH are listed in Table VII. The results show that the composition has good sealant properties. Table VIII lists extrudability and Boeing Jig Sag results initially and after 1, 3 and 36 days. These results show that the sealants of the invention exhibit good stability. The composition also exhibited good freeze-thaw stability.

The particle size distributions of the liquid acrylic polymer and the high molecular weight polymer latex ("Rhoplex 2620") used in the preparation of the plasticizer-polymer dispersion and the sealant, respectively, of the composition set forth in Table VI were evaluated using a multisizer with an orifice size of 140 μm and 15 μm, respectively. The particle size distribution indicated a frequency peak in the particle diameters at 12.08 μm for the plasticized acrylic polymer and a frequency peak in the particle diameters around 0.4 or 0.5 μm for the commercial high molecular weight polymer latex. The resulting polymer blend of Example 3 has a bimodal particle size distribution with a first mode (or peak) at about 0.5 microns and a second mode (or peak) at about 12 microns. This is indicative that mixing the liquid acrylic polymer dispersion and the latex does not significantly destabilize or aggregate the particles of either the dispersion or latex.

TABLE VI

| | |
|---|---|
| PRE-HEAT TO 158° F. LOAD INTO A CLEAN MIXER SET AT 140° F. MIX UNTIL UNIFORM | |
| PLASTICIZER (SANITIZER 160) | 310 g |
| LIQUID ACRYLIC POLYMER | 620 |
| THEN ADD: | |
| TRITON X-405 70% (EMULSIFIER) | 34 |
| TAP WATER | 89} PREMIX BEFORE |
| TAMOL 850-C (EMULSIFIER) | 3.4} ADDING |
| COMPOSITION T (DISPERSANT) | 3.4 |
| MIX AT LOW SPEED FOR 2 MIN. THEN INCREASE SPEED UNTIL EMULSION IS FORMED. STOP MIXER. THEN ADD: | |
| ACRYSOL TT615 | 30 |
| (RHEOLOGY MODIFIER) | |
| RHOPLEX 2620 LATEX | 803 |
| MIX AT LOW SPEED FOR 2 MIN. THEN INCREASE SPEED UNTIL A STATIC UNIFORM EMULSION IS FORMED. SCRAPE BLADE AND SIDE AND BOTTOM OF MIXER. MIX FOR ADDITIONAL 5 MIN. AT HIGH SPEED. THEN ADD: | |
| CALCIUM CARBONATE | 500 |
| MIX FOR 5 MIN. THEN ADD: | |
| CALCIUM CARBONATE | 500 |
| MIX FOR 5 MIN. THEN ADD: | |
| CALCIUM CARBONATE | 500 |
| TITANIUM DIOXIDE | 75 |
| MIX FOR 5 MIN. THEN ADD: | |
| RHOPLEX 2620 LATEX | 632 |
| TRITON X-405 70% | 2.5 |
| FUNGICIDE/MILDEWCIDE | 1.5 |
| MIX UNTIL UNIFORM. THEN ADD: | |
| SILICA | 14 |
| MIX UNTIL FULLY DISPERSED. | |
| THEN ADD: | |
| ZINPLEX 15 | 44 |
| DEFOAMER | 2.5 |
| MIX UNTIL UNIFORM. SCRAPE BLADE AND SIDES OF MIXER. THEN MIX FOR ANOTHER 5 MIN. THEN ADD: | |
| PROPYLENE GLYCOL | 44} PREMIX BEFORE |
| SILANE COUPLING AGENT | 9} ADDING |
| CHECK SAG AND MAKE ADJUSTMENT PRIOR TO FILLING | |

TABLE VII

| 93SD4 #8 | |
|---|---|
| EXTRUDABILITY, S | 38 SECONDS |
| (0.104" orifice, 20 g @ 20 psi) | |
| SAG, BOEING JIG, IN | 0.05 |
| % SOLIDS | 81 |
| pH | 8.1 |

TABLE VII-continued

| 93SD4 #8 | |
| --- | --- |
| PEEL ADHESION, N/mm width | |
| 21 DAYS (1 WK RT* + 1 WK 50° C. + 1 WK RT) | |
| ALUMINUM | 2.283 CF |
| GLASS | 2.758 CF |
| CONCRETE | 2.928 CF |
| ABOVE CURE + 7 DAYS WATER IMMERSION | |
| ALUMINUM | 2.716 CF |
| GLASS | 2.727 CF |
| CONCRETE | 1.950 CF |
| ISO 7389 ELASTIC RECOVERY AFTER 200% EXT FOR 24 HR | |
| NO FAILURE | |
| 1 HOUR | 52% |
| 3 HOURS | 72% |
| HOCKMANN PROCEDURE ASTM C719-86 @ 25% | |
| PASSED - 10 CYCLES | TEST IS STILL ONGOING |
| LOW TEMPERATURE FLEXIBILITY | PASSED -36° C. |

*RT is 23–25° C.

TABLE VIII

| EXTRUDABILITY 0.104 IN. DIA ORIFICE | FRESH | 1 DAY | 3 DAYS | 36 DAYS 1 MONTH |
| --- | --- | --- | --- | --- |
| 20 g SAMPLE  20 psi | 18 SEC | 38 SEC | 52 SEC | 62 SEC |
| 40 psi | — | 7 SEC | 8 SEC | — |
| BOEING JIG SAG (IN.) | 0.05 | 0.05 | — | 0.03 |

The sealant compositions of the invention have also been found to generally exhibit excellent adhesion with various painted metals, vinyl, marble, and cedar substrates, and are therefore generally well suited for use as a general purpose construction sealant.

While in accordance with the patent statutes the best mode and preferred embodiment has been set forth, the scope of the invention is not limited thereto, but rather by the scope of the attached claims.

What is claimed is:

1. A water-based composition, comprising:
   a) a dispersion of plasticized liquid acrylic polymer particles in water, said particles comprising from about 50 to about 80 weight percent of a liquid acrylic polymer and from about 20 to about 50 weight percent of a plasticizer wherein said liquid acrylic polymer has a number average molecular weight from about 12,000 to about 30,000 and wherein said plasticizer has a number average molecular weight from about 200 to about 800 and wherein said dispersion of plasticized acrylic polymer particles has a solids content from about 75 to about 93 weight percent as determined by drying at 105° C. for 1 hour,
   b) from about 20 to about 200 parts by weight of at least one filler, and
   c) from about 100 to about 200 parts by weight of an aqueous based high molecular weight polymer dispersion and/or latex wherein the high molecular weight polymer has a number average molecular weight above 30,000,
   wherein said parts by weight are based upon the 100 parts by weight of the dispersion of plasticized liquid acrylic polymer particles.

2. A water based composition according to claim 1, having from about 80 to about 95 wt. % solids as determined by drying at 105° C. for 1 hours.

3. A water based composition according to claim 1, wherein said liquid acrylic polymer has been derived from monomers of which at least 75 weight percent are alkyl (alkyl) acrylates.

4. A water based composition according to claim 3, wherein the high molecular weight polymer has been derived from monomers of which at least 75 weight percent are alkyl (alkyl) acrylates.

5. A water based composition according to claim 4, having at least 75 weight percent solids as determined by drying at 105° C. for 1 hour.

6. A water based composition according to claim 2, wherein the liquid acrylic polymer of the plasticized liquid acrylic polymer particles has been derived from monomers of which at least 75 weight percent are alkyl (alkyl) acrylates.

7. A water based composition according to claim 6, wherein the polymer of said aqueous based high molecular weight polymer dispersion and/or latex has been derived from monomers of which at least 75 weight percent are alkyl (alkyl) acrylates.

8. A water based composition according to claim 7, having from about 87 to about 95 weight percent solids as determined by drying at 105° C. for 1 hour.

9. A water based composition according to claim 3, wherein said plasticized liquid acrylic polymer particles have a number average diameter of from about 0.5 μm to about 12 μm.

10. A water based composition according to claim 9, wherein said filler is present in amount from about 40 to about 175 parts by weight.

11. A water based composition according to claim 8, wherein said plasticized liquid acrylic polymer particles have a number average diameter from about 0.5 μm to about 12 μm.

12. A water based composition according to claim 11, wherein said plasticizer is an organic ester plasticizing agent.

13. A water based composition according to claim 12, wherein said plasticized liquid acrylic polymer particles are prepared by dispersing said plasticized liquid polymer in water using an emulsifier.

14. A water based composition according to claim 12, wherein said sealant has less than 10 weight percent organic materials which are volatilized in 1 hour at 105° C.

15. A water based composition according to claim 8, wherein said sealant has less than 10 weight percent organic materials which are volatilized in 1 hour at 105° C.

16. A process for preparing a composition, comprising:
   a) plasticizing a liquid acrylic polymer forming a plasticized acrylic polymer, wherein said acrylic polymer has a number average molecular weight from about 12,000 to about 30,000 and the plasticizer has a molecular weight from about 200 to about 800,
   b) emulsifying the plasticized liquid acrylic polymer in water with an emulsifier forming a dispersion of plasticized liquid acrylic polymer particles, and
   c) blending said dispersion of plasticized liquid acrylic polymer particles with an aqueous based high molecular weight polymer dispersion and/or latex wherein the high molecular weight polymer has a number average molecular weight above 30,000.

17. A process according to claim 16, wherein said dispersed plasticized liquid acrylic polymer particles have a number average diameter of from about 0.5 to about 12 μm and wherein the dispersion of plasticized liquid acrylic polymer particles is from about 10 to about 60 weight percent of said composition and said aqueous based high molecular weight polymer dispersion and/or latex is from about 10 to about 80 weight percent of said composition.

18. A process according to claim 17, wherein said plasticizer is an organic ester plasticizer.

19. A process according to claim 18, wherein said composition has less than 10 weight percent organic materials which are volatilized in 1 hour at 105° C.

20. A process according to claim 18, wherein said plasticized liquid acrylic polymer is from about 10 to about 50 weight percent of said composition.

* * * * *